United States Patent
Ushida

(10) Patent No.: US 8,325,903 B2
(45) Date of Patent: Dec. 4, 2012

(54) TELEPHONE DEVICE

(75) Inventor: Takehito Ushida, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1056 days.

(21) Appl. No.: 12/238,869

(22) Filed: Sep. 26, 2008

(65) Prior Publication Data

US 2009/0086938 A1    Apr. 2, 2009

(30) Foreign Application Priority Data

Sep. 28, 2007    (JP) ................................ 2007-253323

(51) Int. Cl.
*H04M 11/00* (2006.01)
(52) U.S. Cl. ........... 379/215.01; 379/93.23; 379/106.09; 379/142.08
(58) Field of Classification Search ............... 379/93.01, 379/93.23, 106.09, 215.01
See application file for complete search history.

(56) References Cited

U.S. PATENT DOCUMENTS

| | | | | |
|---|---|---|---|---|
| 5,327,486 A | * | 7/1994 | Wolff et al. ............... | 379/93.23 |
| 5,764,748 A | * | 6/1998 | Rosenthal et al. ........ | 379/215.01 |
| 6,327,356 B1 | * | 12/2001 | Malik ....................... | 379/215.01 |
| 6,496,283 B1 | | 12/2002 | Kabeya | |
| 7,443,967 B1 | * | 10/2008 | Silver ....................... | 379/106.09 |
| 2007/0060096 A1 | | 3/2007 | Hayakawa | |

FOREIGN PATENT DOCUMENTS

| | | |
|---|---|---|
| JP | 7-177233 | 7/1995 |
| JP | 11-346278 | 12/1999 |
| JP | 2004-187024 A | 7/2004 |
| JP | 2005-269165 A | 9/2005 |
| JP | 2006-229994 A | 8/2006 |
| JP | 2006-340283 | 12/2006 |
| JP | 2007-081759 A | 3/2007 |
| JP | 2007-089212 A | 4/2007 |
| WO | 2007-037155 A1 | 4/2007 |

OTHER PUBLICATIONS

Japan Patent Office; Office Action in Japanese Patent Application No. 2007-253323 (counterpart to the above-captioned U.S. patent application) mailed Sep. 1, 2009.

* cited by examiner

*Primary Examiner* — Simon Sing
*Assistant Examiner* — Van D Huynh
(74) *Attorney, Agent, or Firm* — Baker Botts L.L.P.

(57) ABSTRACT

A telephone device is capable of receiving, during communication with a first external device, a call from a second external device. The telephone device includes a setting unit and a ring alert inhibiting unit. The setting unit is configured so as to be capable of setting the telephone device to either one of a first status, in which a user of the telephone device wants to perform communication, and a second status, in which the user does not want to perform communication, the setting unit being configured so as to be capable of setting the second status, either when communication is started with the first external device, or while the communication with the first external device is being executed. The ring alert inhibiting unit inhibits a sound of a ring alert for informing that a call has been received from the second external device when the telephone device is in the second status.

18 Claims, 4 Drawing Sheets

FIG.2

| STATUS CONDITION | AVAILABILITY OF RECEPTION | CALL NOTIFICATION | RING ALERT |
|---|---|---|---|
| ONLINE | USABLE | YES | YES |
| BUSY | USABLE | YES | NO |
| OFFLINE | UNUSABLE | - | - |

| | NAME (14b1) | TELEPHONE NUMBER (14b2) | DURING-COMMUNICATION STATUS SETTING (14b3) |
|---|---|---|---|
| PC3A | A | AAA-AAA-AAAA | BUSY |
| PC3B | B | BBB-BBB-BBBB | ONLINE |
| PC3C | C | CCC-CCC-CCCC | BUSY |

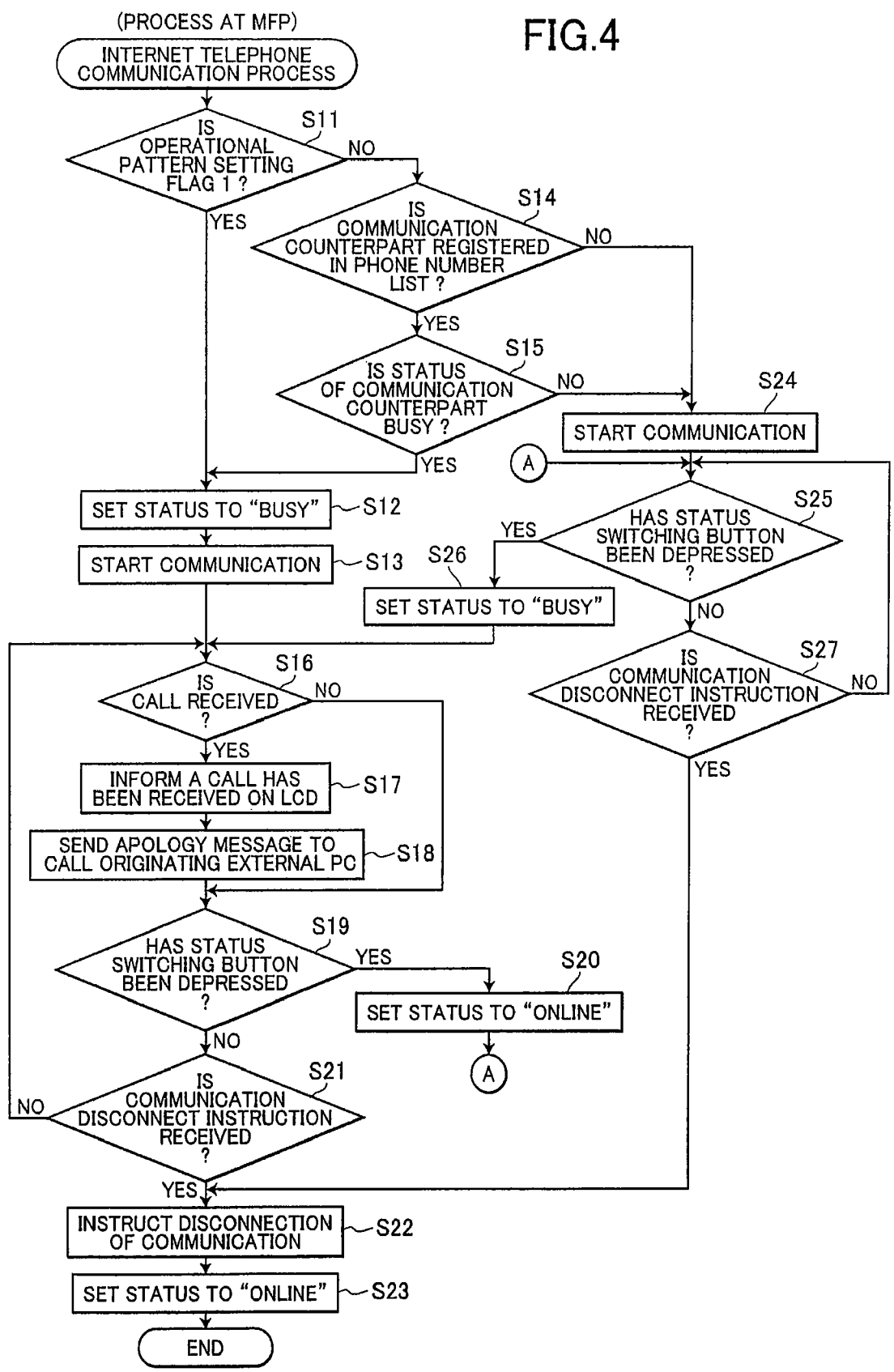

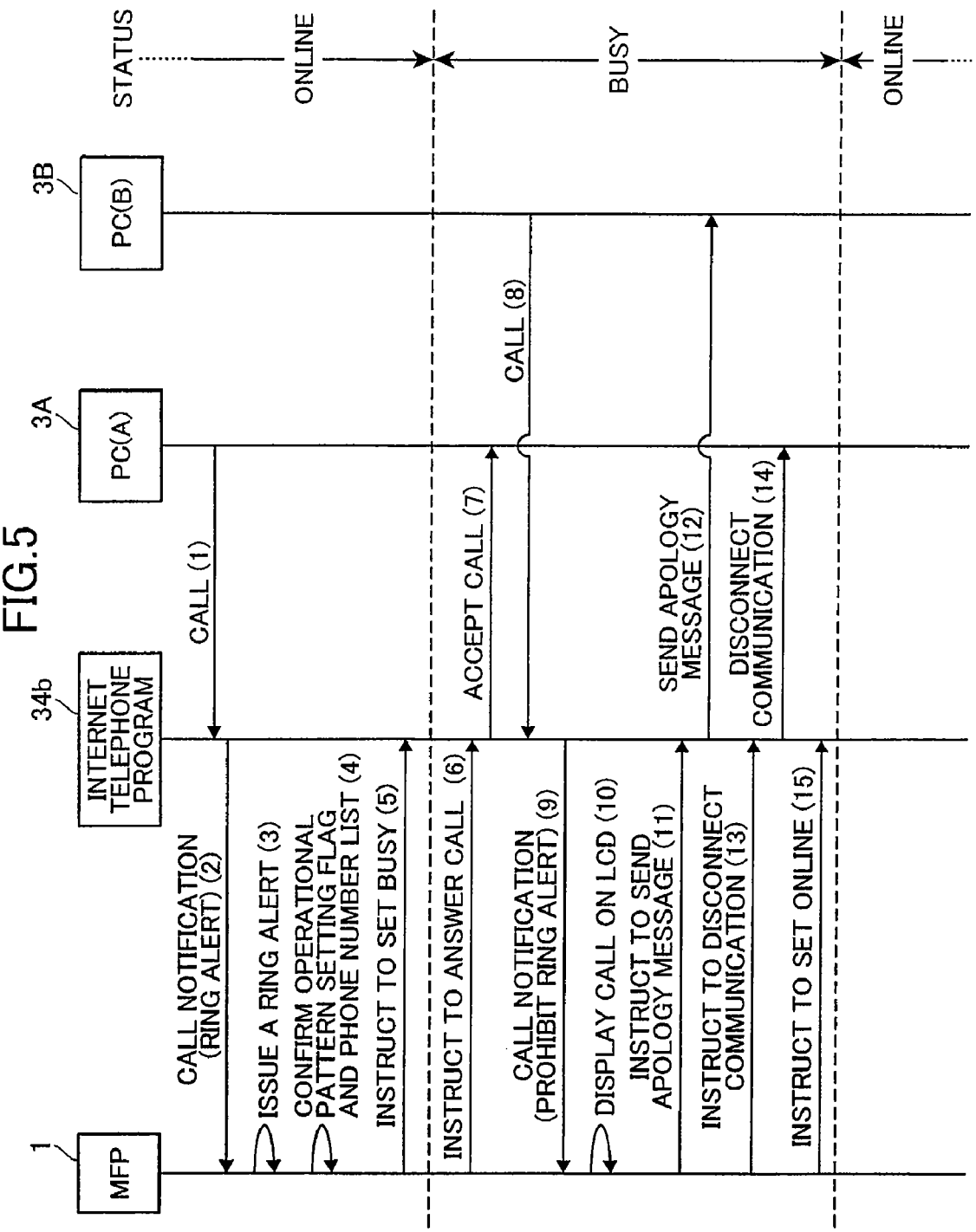

TELEPHONE DEVICE

CROSS REFERENCE TO RELATED APPLICATION

This application claims priority from Japanese Patent Application No. 2007-253323 filed Sep. 28, 2007. The entire content of this priority application is incorporated herein by reference.

TECHNICAL FIELD

The present invention relates to a telephone device.

BACKGROUND

Internet telephone apparatus to communicate with an external device via the Internet is known. Internet telephone apparatus is made available by installing an Internet telephone program offered by an Internet telephone service provider on a personal computer (hereinafter, referred to as "PC") connectable to the Internet. Examples of a known Internet telephone program include "SKYPE" (registered trademark) offered by Skype Technologies S.A.

The Internet telephone apparatus sends and receives packetized sound data to and from an external device in accordance with Internet Protocol (hereinafter, referred to as "IP"). Furthermore, Internet telephone apparatus has various functions which make full use of the characteristics of IP.

For example, the Internet telephone apparatus has a function of accepting a call received from an external device while the Internet telephone apparatus is performing communication with another external device (interrupt function) by taking the advantage that the Internet telephone apparatus can exchange data with two or more devices at the same time. Even during communication with an external device, by using the interrupt function, the Internet telephone apparatus can accept a call by closing the line when the call is received from another external device.

The interrupt function is implemented by a server installed by the Internet telephone service provider, or by the Internet telephone program installed on the PC.

SUMMARY

On the other hand, according to a fixed-line telephone service that uses a telephone line network to allow a fixed-line telephone to communicate with an external device, an interrupt function is also available to inform that a call has been received from another external device during communication with the external device. The interrupt function for the fixed-line telephone is implemented by a telephone switchboard. For instance, Japanese Unexamined Patent Application Publication No. H11-346278 describes sending an instruction for inhibiting the fixed-line telephone interrupt function to the telephone switchboard during or before communication. The telephone switchboard inhibits the interrupt function based on the received instruction.

However, neither the server installed by the Internet telephone service provider nor the Internet telephone program has a function of inhibiting the interrupt function. The interrupt function cannot be inhibited at the user's convenience. The interrupt function gives a ring alert to inform that a call has been received from another external device, thereby blocking the current communication. In this case, the user cannot focus on the current communication.

In view of the foregoing, it is an object of the present invention to provide a telephone device that enables a user to focus on current communication with one external device, even when a call is received from another external device while the user is performing communication with the one external device.

In order to attain the above and other objects, the invention provides a telephone device that communicates with a first external device and is capable of receiving, via a communication control device, a call from a second external device during a communication with the first external device. The communication control device is configured so as to be capable of being set to either a first status in which communication is available or a second status in which communication is unfavorable. The communication control device includes: a communication control unit; a call detection unit; and a ring alert inhibiting unit. The communication control unit controls the communication with the first external device. The call detection unit detects a call from the second external device during the communication with the first external device. The ring alert inhibiting unit is actuated in the second status to inhibit issuance of a ring alert for informing reception of the call which is sent from the second external device and which is detected by the call detection unit. The telephone device includes: a communication start instruction unit; and a setting unit. The communication start instruction unit instructs the communication control unit to start communication with the first external device. The setting unit is configured so as to be capable of setting the telephone device to the second status, when starting the communication with the first external device in accordance with the instruction by the communication start instruction unit, or while the communication control unit is executing communication with the first external device, the setting unit instructing the communication control device to be set to the second status when the setting unit sets the telephone device to the second status.

According to another aspect, the invention provides a telephone device capable of receiving, during communication with a first external device, a call from a second external device. The telephone device includes a setting unit and a ring alert inhibiting unit. The setting unit is configured so as to be capable of setting the telephone device to either one of a first status, in which a user of the telephone device wants to perform communication, and a second status, in which the user does not want to perform communication, the setting unit being configured so as to be capable of setting the second status, either when communication is started with the first external device, or while the communication with the first external device is being executed. The ring alert inhibiting unit inhibits a sound of a ring alert for informing that a call has been received from the second external device when the telephone device is in the second status.

BRIEF DESCRIPTION OF THE DRAWINGS

FIG. 2 indicates, for each status, operations that an Internet telephone program performs when the program receives a call from a counterpart device;

FIG. 3 is a schematic diagram showing contents of a phone number list stored in a phone number list area;

FIG. 4 is a flowchart showing an Internet telephone communication process; and

FIG. 5 shows an exemplary sequence of a process performed by the Internet telephone system.

DETAILED DESCRIPTION

Figure 1:
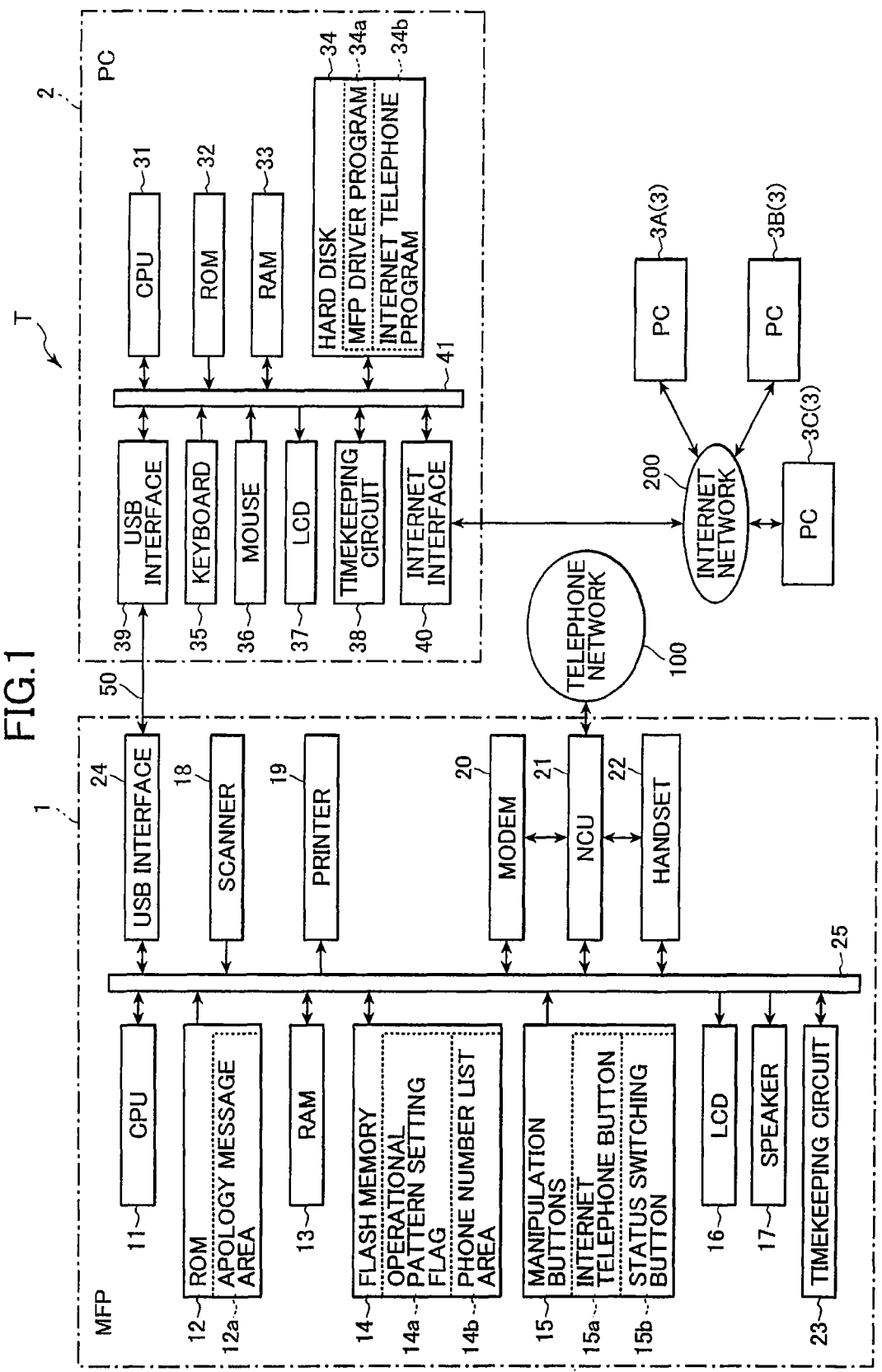
FIG. 1 is a block diagram showing an electrical configuration of an Internet telephone system according to an embodiment of the present invention.

Next, an embodiment of the present invention will be described while referring to the accompanying drawings. FIG. 1 is a block diagram showing an electrical configuration of an Internet telephone system T according to the embodiment of the present invention. The Internet telephone system T includes a multifunction peripheral (hereinafter, abbreviated as "MFP") 1, and a personal computer (PC) 2. The MFP 1 and the PC 2 are connected to each other via a universal serial bus (USB) cable 50.

The MFP 1 has various functions such as an Internet telephone function, a fixed-line telephone function, a facsimile function, a printing function, a scanning function, and a copying function. The PC 2 works as a control device for controlling the Internet telephone system T. The PC 2 is connected to the Internet via an Internet network 200. The Internet telephone system T can make an Internet phone call via the Internet network 200, to each of external PCs 3 (3A, 3B, and 3C, in this example).

In the Internet telephone system T, an Internet telephone program 34b is installed on a hard disk 34 of the PC 2, to be described later. The Internet telephone program 34b is started when the PC 2 is powered on. A CPU 31 keeps running the Internet telephone program 34b until a user instructs the program to terminate by manipulating a keyboard 35 or a mouse 36, or until the user powers off the PC 2. The MFP 1 controls the Internet telephone program 34b to make an Internet phone communication with each of the external PCs 3, by using a handset 22 included in the MFP 1.

The Internet telephone program 34b has an interrupt function of receiving a call sent from one external PC (for example, PC 3B) during communication with another external PC (for example, PC 3A). According to the interrupt function of the present embodiment, the user of the Internet telephone system T can focus on the communication with the external PC 3A, even when the Internet telephone system T receives a call from the different external PC 3B.

The Internet telephone program 34b also has a text message function. The text message function enables text data to be sent and received between the Internet telephone system T and a counterpart device.

The Internet telephone program 34b further has a status function. The status function notifies the status of the user of the Internet telephone system T to the Internet network 200 so as to enable the external PCs 3 to know the status of the user of the Internet telephone system T. More specifically, when the user's current status is set to the Internet telephone program 34b, the Internet telephone program 34b informs the current status to an Internet server (not shown), provided on the Internet network 200. As a result, the external PCs 3 can access the Internet server and check the status of the Internet telephone system T before making an Internet phone call to the Internet telephone system T.

Here, the status will be described in greater detail with reference to FIG. 2. FIG. 2 indicates, for each status, how the Internet telephone program 34b processes an incoming call when the call is received from a counterpart device. As shown in FIG. 2, the statuses "online", "busy", and "offline" are available as the user's state. The status "online" means a state in which the user is ready to perform communication. The status "busy" means a state in which the user does not want to perform communication. The status "offline" means a state in which the user is unable to perform communication. The state in which the user does not want to perform communication (busy) is, for example, a state in which the user has difficulty in answering a phone call because the user is not at the desk, or because the user is focusing on a given task.

Referring to FIG. 2, if the status has been set to "online", when an incoming call is received from a counterpart device while the line is opened, the Internet telephone program 34b can accept the incoming call by closing the line. The Internet telephone program 34b notifies the MFP 1 of the call reception. In this case, the Internet telephone program 34b instructs the MFP 1 to make a ring alert (ringing sound) to inform the user that the call has been received. Therefore, the user can answer the call. It is noted that when the Internet telephone program 34b is started, the status is initially set to "online".

If the status has been set to "busy", when the Internet telephone program 34b receives an incoming call from a counterpart device while the line is opened, the Internet telephone program 34b can accept the incoming call by closing the line. The Internet telephone program 34b notifies the MFP 1 of the call. In this case, the Internet telephone program 34b instructs the MFP 1 not to make a ring alert. The MFP 1 only displays a message or indication informing the user that the call has been received, on a liquid crystal display (hereinafter, referred to as "LCD") 16 to be described later. Therefore, the user can focus on the task without being disturbed by the ring alert. Furthermore, the user can answer the call when necessary, by viewing the massage displayed on the LCD 16.

On the other hand, if the status has been set to "offline", even when the Internet telephone program 34b receives an incoming call from a counterpart device while the line is opened, the Internet telephone program 34b does not close the line to accept the incoming call. Therefore, the Internet telephone program 34b can block the call from the counterpart device completely.

Referring back again to FIG. 1, a configuration of the MFP 1 is described in detail. The MFP 1 has a CPU (central processing unit) 11, a ROM (read-only memory) 12, a RAM (random access memory) 13, a flash memory 14, manipulation buttons 15, the LCD 16, a speaker 17, a scanner 18, a printer 19, a modem 20, a network control unit (NCU) 21, the handset 22, a timekeeping circuit 23, and a USB interface 24, which are connected to one another via a bus line 25.

The CPU 11 controls each of the components in the MFP 1 that are connected to the CPU 11 via the bus line 25, in accordance with fixed values and programs stored in the ROM 12, the RAM 13, or the flash memory 14, or in accordance with various signals sent to and received from outside via the NCU 21 or the USB interface 24.

The ROM 12 is a non-rewritable, nonvolatile memory that stores various control programs to be executed by the MFP 1, and fixed values to be referred to by the control programs. For example, the ROM 12 stores a program for performing an Internet telephone communication process to be described later, shown in the flowchart of FIG. 4. The ROM 12 includes an apology message area 12a.

The apology message area 12a is a memory area that stores text data of an apology message. The apology message is a text message to be transmitted to an external PC (for example, PC 3B) in the Internet telephone communication process (see FIG. 4), when a call is received from the external PC (PC 3B) while the Internet telephone system T is communicating with another external PC (for example, PC 3A) and the Internet telephone system T has been set to "busy". The apology message is for informing the external PC (PC 3B or PC 3C) that the Internet telephone system T is now on another call and is busy. One example of the apology message is, "Sorry, I am on another call right now. Could you please try again later."

While the Internet telephone system T is executing the Internet telephone communication process to communicate with one external PC (for example, PC 3A), when the CPU 11 detects a call from another external PC (PC 3B), for example, if the Internet telephone system T has been set to "busy", the CPU 11 reads the apology message from the apology message area 12a, and then instructs the Internet telephone program 34b to send the apology message to the call-originating external PC (for example, PC 3B). Upon receipt of this instruction, the Internet telephone program 34b sends the apology message to the call-originating external PC (PC 3B) by using the text message function. This enables a user of the other external PC (PC 3B) to recognize that the user of the Internet telephone system T is on another call.

The RAM 13 is a rewritable, volatile memory used for temporarily storing various programs and various kinds of data. The flash memory 14 is a rewritable, nonvolatile memory. Data stored in the flash memory 14 is retained even after the MFP 1 is powered off. The flash memory 14 includes an operational pattern setting flag 14a and a phone number list area 14b.

The operational pattern setting flag 14a is a flag for indicating whether or not the status should be set to "busy" when the Internet telephone system T is communicating with one of the external PCs 3. The operational pattern setting flag 14a is set to "1" indicating that the status should be set to "busy" when the Internet telephone system T is communicating with any external PC 3. The operational pattern setting flag 14a is set to "0" otherwise. The user can set the operational pattern setting flag 14a by operating the manipulation buttons 15.

When the Internet telephone communication process starts, the CPU 11 reads the operational pattern setting flag 14a. If the operational pattern setting flag 14a is "1", the CPU 11 instructs the Internet telephone program 34b to set the status to "busy".

The phone number list area 14b is a memory area that stores a phone number list. Now, the phone number list stored in the phone number list area 14b will be described with referring to FIG. 3. FIG. 3 is a schematic diagram showing contents of the phone number list stored in the phone number list area 14b. The phone number list associates names 14b1 given to the external PCs 3, with telephone numbers 14b2 and during-communication status settings 14b3 to be made during communication. By operating the manipulation buttons 15, the user can enter information about a new external PC, and can rewrite information about each external PC that has already been entered, into new information.

The names 14b1 are provided to identify each of the external PCs 3. The name "A" corresponds to the external PC 3A. The name "B" corresponds to the external PC 3B. The name "C" corresponds to the external PC 3C.

The telephone numbers 14b2 are telephone numbers of the external PCs 3. Specifically, the telephone number "AAA-AAA-AAAA" of the PC 3A is associated with the name "A". The telephone number "BBB-BBB-BBBB" of the PC 3B is associated with the name "B". The telephone number "CCC-CCC-CCCC" of the PC 3C is associated with the name "C".

During-communication status setting 14b3 is a status of the Internet telephone system T that should be set while the Internet telephone system T is communicating with one of the external PCs 3. The during-communication status setting 14b3 is associated with the name 14b1 of each of the external PCs 3, and indicates whether or not the status should be set to "busy" when the Internet telephone system T communicates with the corresponding external PC. In this example, the status "busy" is associated with the name "A", to indicate that the status should be set to "busy" while the Internet telephone system T is communicating with the PC 3A. The status "online" is associated with the name "B", to indicate that the status should be set to "online" while the Internet telephone system T is communicating with the PC 3B. The status "busy" is associated with the name "C", to indicate that the status should be set to "busy" while the Internet telephone system T is communicating with the PC 3C. The user can change the during-communication status setting 14b3 for each external PC at the user's convenience by operating the manipulation buttons 15.

When starting the Internet telephone communication process, the CPU 11 checks whether or not the name 14b1 or the telephone number 14b2 of a communication counterpart (counterpart PC) with which the CPU 11 is to start communication, has been registered in the phone number list. If either the name 14b1 or the telephone number 14b2 of the communication counterpart (counterpart PC) has been registered in the phone number list, the CPU 11 reads from the phone number list, the during-communication status setting 14b3 corresponding to the name or the telephone number of the communication counterpart. If the read out during-communication status setting 14b3 is "busy", the CPU 11 instructs the Internet telephone program 34b to set the status to "busy".

Now, returning to FIG. 1, the manipulation buttons 15 are for switching various functions, such as the Internet telephone function, the fixed-line telephone function, the scanning function, the printing function, and the facsimile function. The manipulation buttons 15 are also used for instructing various operations to be performed, as well as for instructing various settings to be made. The manipulation buttons 15 include an Internet telephone button 15a and a status switching button 15b.

The user manipulates the Internet telephone button 15a to instruct the MFP 1 to perform an Internet phone communication. By operating the Internet telephone button 15a, the user can instruct the MFP 1: to send a call; to accept an incoming call when receiving the call; and to disconnect a call. More specifically, the user selects one external PC desired to be communicated with, among the external PCs 3 included in the phone number list area 14b, and then depresses the Internet telephone button 15a. As a result, the MFP 1 sends the telephone number of the selected external PC to the Internet telephone program 34b, and instructs the Internet telephone program 34b to send a call to the selected external PC.

When the Internet telephone program 34b informs the MFP 1 that the Internet telephone program 34b has received an incoming call, if the user depresses the Internet telephone button 15a, the Internet telephone program 34b accepts the call by closing the line and then starts communication. Furthermore, if the user depresses the Internet telephone button 15a while the user is performing communication with one of the external PCs 3, the MFP 1 instructs the Internet telephone program 34b to finish the communication.

The status switching button 15b is used to switch the status between "online" and "busy". When the user depresses the status switching button 15b to change the status from "online" to "busy", the MFP 1 instructs the Internet telephone program 34b to set the status to "busy". On the other hand, when the user depresses the status switching button 15b to change the status from "busy" to "online", the MFP 1 instructs the Internet telephone program 34b to set the status to "online".

The LCD 16 displays a menu or an operating state, in response to the operation of the manipulation buttons 15. When the user manipulates the manipulation buttons 15, the LCD 16 displays information corresponding to the manipulated results. The LCD 16 also displays a state of an incoming call received from one of the external PCs 3. When the MFP 1 is informed by the Internet telephone program 34b that an incoming call has been received, the CPU 11 controls the LCD 16 to display an indication that the incoming call has been received.

The speaker 17 outputs various sounds (for example, a sound to be generated when the user manipulates the manipulation buttons 15, and a sound to be generated when an error occurs) according to the situations, so as to inform the user of the current situation. The speaker 17 also outputs a ring alert (ringing sound) when the Internet telephone program 34b informs the MFP 1 that an incoming call has been received, and instructs the MFP 1 to generate a ring alert. On the other hand, when the Internet telephone program 34b informs the MFP 1 that a call has been received but instructs the MFP 1 not to make a ring alert, the CPU 11 controls the speaker 17 not to make a ring alert.

The scanner 18 scans an image from an original document set on a document table (not shown) included in the scanner 18, in accordance with an instruction issued from the CPU 11. The scanner 18 then generates image data to be displayed by the LCD 16 or to be printed by the printer 19. The image data obtained by scanning the image from the original with the scanner 18 is stored in a predetermined storage area within the RAM 13 if the MFP 1 has been set to one of a facsimile mode, a scanning mode and a copying mode.

The printer 19 performs printing on each recording sheet held in a sheet cassette (not shown) included in the printer 19, in accordance with an instruction issued from the CPU 11.

In accordance with an instruction issued from the CPU 11, the modem 20 modulates data, stored in the RAM 13, into image signals that are transmittable to a telephone line network 100, and sends the image signals via the NCU 21 to the telephone line network 100; and receives incoming image signals received from the telephone line network 100 via the NCU 21 and demodulates the image signals into image data that is displayable on the LCD 16 or printable by the printer 19.

The NCU 21 is connected to the telephone line network 100. The NCU 21 transmits dial signals to the telephone line network 100, and responds to ringing signals coming from the telephone line network 100.

The user uses the handset 22 to perform communication with an external device (not shown) connected to the MFP 1 through the telephone line network 100 (fixed-line phone call), as well as to perform communication with the external PCs 3 connected to the MFP 1 through the Internet network 200 and the PC 2 (Internet phone call). The handset 22 includes a microphone (not shown) for converting sound into sound signals; and a speaker (not shown) for converting sound signals into sound and outputting the sound externally.

The timekeeping circuit 23 includes an internal clock for keeping time and date. The timekeeping circuit 23 is a known circuit for calculating an elapsed time by comparing the time and date when time keeping has been started, with the current time and date.

The USB interface 24 is a USB-compliant interface for performing data communication. The USB interface 24 includes a connector (not shown), to which the USB cable 50 is connected. In the embodiment, the USB interface 24 is connected to a USB interface 39 of the PC 2 via the USB cable 50. This enables various kinds of data to be transmitted between the MFP 1 and the PC 2.

Next, a configuration of the PC 2 is described in detail. The PC 2 includes the CPU 31, a ROM 32, a RAM 33, a hard disk 34, the keyboard 35, the mouse 36, an LCD 37, a timekeeping circuit 38, the USB interface 39, and an Internet interface 40, which are connected to one another via a bus line 41.

The CPU 31 controls each of the components in the PC 2 that are connected to the CPU 31 via the bus line 41, in accordance with fixed values and programs stored in the ROM 32, the RAM 33, or the hard disk 34, or in accordance with various signals sent to and received from outside via the USB interface 39 or the Internet interface 40.

The ROM 32 is a non-rewritable, nonvolatile memory that stores a BIOS (basic input/output system) program executed by the CPU 31 to control input and output of data to and from each of the components in the PC 2 that are connected to the CPU 31 via the bus line 41, and stores various settings that the CPU 31 refers to when the CPU 31 executes the BIOS. The RAM 33 is a rewritable, volatile memory used by the CPU 31 to temporarily store various programs and various kinds of data.

The hard disk 34 is a rewritable, nonvolatile memory disk that stores various programs to be executed by the CPU 31, such as an OS and application programs, as well as various settings. The hard disk 34 stores an MFP driver program 34a and the Internet telephone program 34b.

The PC 2 executes the MFP driver program 34a to control the MFP 1. The CPU 31 starts the MFP driver program 34a when the MFP 1 is powered on in a state that the MFP 1 is connected to the USB interface 39 through the USB cable 50. The MFP driver program 34a keeps running until the MFP 1 is disconnected from the USB interface 39, or until the MFP 1 is powered off. The CPU 31 controls the operation of the MFP 1 by executing the MFP driver program 34a.

The MFP driver program 34a also serves as an interface between the MFP 1 and the Internet telephone program 34b. Specifically, in order that the Internet telephone program 34b notifies the MFP 1 that an incoming call has been received and instructs the MFP 1 to or not to make a ring alert, the CPU 31 converts the notification and the instruction into commands for the MFP 1 by using the MFP driver program 34a. The converted commands are then sent to the MFP 1 via the USB interface 39. On the other hand, when the MFP 1 instructs, via the USB interface 39, the PC 2 to set the status or to send an apology message to an external device, the CPU 31 converts the instruction into commands for the Internet telephone program 34b by using the MFP driver program 34a, and sends the commands to the Internet telephone program 34b. In this way, the MFP driver program 34a enables the MFP 1 and the Internet telephone program 34b to exchange notifications and instructions therebetween.

The keyboard 35 and the mouse 36 are input devices that enable the user to input text and instructions to the PC 2. The LCD 37 is a display device that displays various results and various sets of information that the CPU 31 obtains by executing the programs. The timekeeping circuit 38 includes an internal clock for keeping time and date. The timekeeping circuit 38 is a known circuit for calculating an elapsed time by comparing the time and date when time keeping has been started, with the current time and date.

Similarly to the USB interface 24 of the MFP 1, the USB interface 39 is a USB-compliant interface for data transmission. In the embodiment, the USB interface 39 is connected to the USB interface 24 of the MFP 1 through the USB cable 50.

Referring to the flowchart of FIG. 4, the Internet telephone communication process performed by the MFP 1 will be described. The CPU 11 executes this process in order to communicate with one of the external PCs 3 through the PC 2 via the Internet. The CPU 11 starts this process when the user depresses the Internet telephone button 15a in response to the notification received from the Internet telephone program 34b and informing that an incoming call has been received from an external PC 3 or when the user depresses the Internet telephone button 15a to instruct the Internet telephone program 34b to send an outgoing call to an external PC 3.

In the Internet telephone communication process, in S11, the CPU 11 reads the operational pattern setting flag 14a from the flash memory 14, and then judges whether or not the flag is "1". If the CPU 11 determines that the operational pattern setting flag 14 is "1" (S11: Yes), the CPU 11 instructs the Internet telephone program 34b to set the status to "busy" in S12, and then instructs the Internet telephone program 34b to start communication in S13.

Accordingly, if the operational pattern setting flag 14a has been set to "1", the status is set to "busy" when the Internet telephone program 34b communicates with any of the external PCs 3, even though the user does not perform any particular manipulations. Since the status is thus set to "busy", the Internet telephone program 34b notifies the Internet network 200 that the status of the Internet telephone system T is now set to "busy". So, external PCs 3 other than the subject external PC 3(3A, for example) that is now to communicate with the Internet telephone system T can know that the status of the Internet telephone system T is "busy". Therefore, users of the other external PCs 3 can recognize that the user of the Internet telephone system T does not want any communication, and may decide not to send a call to the Internet telephone system T. When the user of one of the other external devices (3B, for example) makes a call to the Internet telephone system T, however, the Internet telephone program 34b notifies the MFP 1 to inform that the call has been received, but instructs the MFP 1 not to issue a ring alert. Therefore, the MFP 1 is prohibited from issuing a ring alert in accordance with the instruction. This can prevent the current communication with the external device 3A from being blocked by the ring alert, and the user can focus on the current communication.

On the other hand, if the CPU 11 determines that the operational pattern setting flag 14a is not "1", specifically "0" (S11: No), the CPU 11 reads the phone number list stored in the phone number list area 14b from the flash memory 14, and determines in S14 whether the information of a communication counterpart (counterpart PC) to be communicated with, has been registered in the phone number list, based on the name or telephone number of the communication counterpart (counterpart PC) in S14. If the CPU 11 determines that the information of the communication counterpart (counterpart PC) has been registered in the phone number list (S14: Yes), the CPU 11 judges whether the status setting 14b3 for the communication counterpart (counterpart PC) registered in the phone number list is "busy" in S15.

If the CPU 11 determines that the status setting 14b3 for the counterpart device is "busy" (S15: Yes), the CPU 11 advances to S12.

In this way, by previously setting a communication counterpart (counterpart PC) desired to be focused on in the phone number list with its corresponding status setting 14b3 being set to "busy", it is ensured that the status is set to "busy" whenever communication is established with the subject communication counterpart (counterpart PC).

After executing the process of S13, the CPU 11 judges in S16 whether or not a reception notification has been received from the Internet telephone program 34b, notifying that a call has been newly received from an external PC 3 other than the communication counterpart PC 3 with which the Internet telephone system T is now performing communication. If a reception notification is received (S16: Yes), the CPU 11 displays on the LCD 16 a message or indication informing that an incoming call has been received in S17. As a result, even though the MFP 1 issues no ring alert because the status is "busy", the user can recognize that the call has been received, viewing the message or indication displayed on the LCD 16. Therefore, the user can accept and answer the call when necessary.

In S18, the CPU 11 reads text data of the apology message from the apology message area 12a of the ROM 12, and then instructs the Internet telephone program 34b to send the text data of the apology message to the external PC that has originated the call notified in S16. After executing the process of S18, the CPU 11 advances to S19.

As a result, the Internet telephone program 34b uses its text message function to send the apology message to the external PC that has originated the call. Therefore, the call originating external PC can recognize that the Internet telephone system T cannot answer the call because the Internet telephone system T is now making communication with another PC. Since the apology message is text data, the apology message does not have to be transmitted in real time as sound data, but can be transmitted gradually. Therefore, even when the line is overloaded, the apology message can be delivered to the call originating PC without fail. Furthermore, by giving higher priority onto data for the current communication than the apology message text data, it is possible to prevent quality degradation in the current communication that may possibly occur when the apology message is transmitted.

On the other hand, if the CPU 11 determines that no reception notification has been received in S16, the CPU 11 advances to S19. In S19, the CPU 11 judges whether or not the status switching button 15b has been depressed. If the CPU 11 determines that the status switching button 15b has been depressed (S19: Yes), the CPU 11 instructs the Internet telephone program 34b to set the status to "online" in S20. The CPU 11 then advances to S25. Hereinafter, the process for the case in which the status is "online", is performed.

In this way, if the status has been set to "busy", when the user depresses the status switching button 15b, the status is switched from "busy" to "online" even during communication with one external device 3. Because the status is thus newly set to "online", the ring alert will be made if a call is received from another external PC.

If the CPU 11 determines that the status switching button 15b has not been depressed (S19: No), the CPU 11 judges whether or not the Internet telephone button 15a has been depressed to instruct disconnection of the current communication in S21. If the CPU 11 determines that an instruction has been provided to disconnect the communication (S21: Yes), the CPU 11 advances to S22. On the other hand, if the CPU 11 determines that no instruction has been provided to disconnect the communication (S21: No), the CPU 11 returns to S16. The CPU 11 then repeats S16 to S21 and S25 to S27 to be described later until an instruction is provided to disconnect the communication in S21 or in S27.

On the other hand, if the CPU 11 determines that the information of the communication counterpart (counterpart PC) is not registered in the phone number list (S14: No), or if the CPU 11 determines that the status setting 14b3 of the communication counterpart (counterpart PC) is not "busy" but is "online" (S15: No), the CPU 11 proceeds to S24 to instruct the Internet telephone program 34b to start communication.

In this case, the status is set to "online" as the initial status. During communication with one external PC, if a call is received from another external PC, the Internet telephone program 34b sends a reception notification to the MFP 1, and instructs the MFP 1 to give a ring alert so as to inform the user that a call has been received. So, the MFP 1 makes a ring alert in response to the instruction. Listening to the ring alert, the user is informed without fail that a call has been received from another external PC.

After executing S20 or S24, the CPU 11 judges whether or not the status switching button 15b has been depressed in S25. If the CPU 11 determines that the status switching button 15b has been depressed (S25: Yes), the CPU 11 instructs the Internet telephone program 34b to set the status to "busy" in S26, and then proceeds to S16. Hereinafter, the process for the case in which the status is "busy", is performed.

In this way, when the status is "online", the status can be switched from "online" to "busy" even during communication with one external PC when the user depresses the status switching button 15b. Therefore, even during communication with one external PC, the ring alert to inform that a call has been received from another external PC can be inhibited. The user depresses the status switching button 15b so as to focus on the current communication even during the communication. In S19 and S25, the user depresses the status switching button 15b to switch between the statuses ("busy" and "online") at the user's convenience.

On the other hand, if the CPU 11 determines that the status switching button 15b has not been depressed (S25: No), the CPU 11 determines whether or not the Internet telephone button 15a has been depressed to instruct the current communication to be disconnected in S27. If the CPU 11 determines that an instruction has been provided to disconnect the communication (S27: Yes), the CPU 11 proceeds to S22. On the other hand, if the CPU 11 determines that no instruction has been provided to disconnect the communication (S27: No), the CPU 11 returns to S25. The CPU 11 then repeats S25 to S27 and S16 to S21 until an instruction is provided to disconnect the communication in S27 or S21.

In S22, the CPU 11 instructs the Internet telephone program 34b to disconnect the communication. This enables the Internet phone call to be disconnected. In S23, the CPU 11 instructs the Internet telephone program 34b to set the status to "online" (initial status), and then ends the Internet telephone communication process.

Since the status is set to "online" after the communication is ended, the external PCs 3 can recognize that the Internet telephone system T is available. Furthermore, a ring alert can be given when a call is received from any of the external PCs 3, thereby informing the user without fail that the call has been received.

Now, an exemplary sequence of the process performed by the Internet telephone system T will be described with referring to FIG. 5. FIG. 5 shows an exemplary sequence of the process performed by the Internet telephone system T. FIG. 5 shows the sequence of the process performed between the MFP 1, the Internet telephone program 34b, and the external PCs 3A and 3B. On the right side of FIG. 5, status of the Internet telephone program 34b is provided. Note that the status has been set to "online" as an initial status. FIG. 5 shows an example case in which a call is received from the PC 3A, followed by another call received from the PC 3B during the communication with the PC 3A.

In the process sequence, (1) the PC 3A originates a call to the Internet telephone system T. (2) Since the status has been set to "online", the Internet telephone program 34b receives the originated call, instructs the MFP 1 to give a ring alert, and makes a reception notification to the MFP 1.

(3) Receiving the reception notification from the Internet telephone program 34b, the MFP 1 gives a ring alert. (4) When the user depresses the Internet telephone button 15a, the MFP 1 starts the Internet telephone communication process (see FIG. 4), checks the operational pattern setting flag 14a in accordance with the process flow (S11 in FIG. 4), and checks the phone number list stored in the phone number list area 14b (S14 and S15 in FIG. 4). (5) If the operational pattern setting flag 14a has been set to "1" (S11 in FIG. 4: Yes), or if the status setting 14b3 corresponding to the PC 3A (name 14b1: "A") has been set to "busy" in the phone number list (S15 in FIG. 4: Yes), the MFP 1 instructs the Internet telephone program 34b to set the status to "busy" in S12 in FIG. 4. The Internet telephone program 34b then sets the status to "busy" in accordance with the instruction. As a result, the external PCs 3B-3C can know that the Internet telephone system T is busy.

(6) The MFP 1 instructs the Internet telephone program 34b to accept and to answer the call by closing the line. (7) The Internet telephone program 34b accepts the call received from the PC 3A by closing the line. As a result, communication is started between the PC 3A and the Internet telephone system T.

(8) A call to the Internet telephone system T is originated from the PC 3B. (9) Since the status is "busy", the Internet telephone program 34b receives the originated call, instructs the MFP 1 not to make a ring alert, and makes a reception notification to the MFP 1. (10) Receiving the reception notification, the MFP 1 displays on the LCD 16 a message or indication informing that a call has been received, in S17 of FIG. 4, without giving a ring alert. So, the user can focus on the communication with the PC 3A, without being blocked by any ring alert. Furthermore, the user can recognize that a call has been received by viewing the message or indication displayed on the LCD 16. Therefore, the user can accept and answer the call from the PC 3B by closing the line when necessary.

(11) The MFP 1 instructs the Internet telephone program 34b to send an apology message to the PC 3B in S18 of FIG. 4. (12) The Internet telephone program 34b sends the apology message to the PC 3B, using the text message function. This enables the user of the PC 3B to recognize that the Internet telephone system T cannot answer his/her originating call because the Internet telephone system T is now performing communication with another PC.

(13) When the user depresses the Internet telephone button 15a in the MFP 1, the MFP 1 instructs the Internet telephone program 34b to disconnect the communication in S22 of FIG. 4. (14) The Internet telephone program 34b disconnects the communication with the PC 3A. (15) The MFP 1 instructs the Internet telephone program 34b to set the status to "online" in S23 of FIG. 4. In response to the instruction, the Internet telephone program 34b sets the status back to "online". As a result, the external PCs 3 can recognize that the Internet telephone system T is available. The MFP 1 is brought into a condition that the MFP 1 can make a ring alert. The user of the MFP 1 can recognize without fail that a new call has been received.

As described above, in the embodiment, when a communication is started with one external PC (for example, PC 3A) or during the communication therewith, the status for the status function offered by the Internet telephone program 34b can be set to "busy". So, the other external PCs (PC 3B and 3C) can know that the status of the Internet telephone system T is "busy". Therefore, even when a user of the other external PCs (PC 3B and 3C) is ready to originate a call to the Internet telephone system T, the user of the other external PC can recognize that the user of the Internet telephone system T does not want any communication with the external PC. This suppresses the user of the other external PC from originating a call to the Internet telephone system T. Furthermore, during communication with one external PC (PC 3A, for example), when a call is received from another external PC (PC 3B or 3C), the MFP 1 is prohibited from issuing a sound of a ring alert to inform that the call has been received. So, during communication with one external PC (PC 3A), the communication can be prevented from being blocked by the ring alert. Even when a call is received from another external PC (PC 3B or 3C) during the communication with the external PC (PC 3A), the user can focus on the communication with the external PC (PC 3A).

While the invention has been described in detail with reference to the embodiment thereof, it would be apparent to those skilled in the art that various changes and modifications may be made therein without departing from the spirit of the invention.

In the embodiment, the Internet telephone system T is configured from both of the MFP 1 and the PC 2. However, the Internet telephone system T can be configured from the MFP 1 only. In this case, the MFP 1 includes an Internet interface, with which the MFP 1 can be connected with the Internet network 200. The flash memory 14 stores the Internet telephone program 34b. The flash memory 14 further stores a program for generating an instruction command to be provided to the Internet telephone program 34b, instead of the MFP driver program 34a.

In the embodiment, the operational pattern setting flag 14a is provided to indicate whether or not to set the status to "busy" in the status function offered by the Internet telephone program 34. However, the operational pattern setting flag 14a may not be provided in the MFP 1. A determination can be made whether or not to set the status to "busy" only based on the status setting 14b3 registered in the phone number list area 14b for each of the external PCs 3A to 3C. Specifically, S11 can be omitted from FIG. 4, and the Internet telephone communication process can start with S14.

In the embodiment, the phone number list area 14b is provided to determine whether or not the status should be set to "busy", based on the status setting 14b3 that has been registered for each of the counterpart devices (external PCs 3A to 3C) to be communicated with. However, the phone number list area 14b may not be stored in the flash memory 14. A determination can be made whether or not to set the status to "busy", only based on the operational pattern setting flag 14a. Specifically, S14 and S15 can be omitted from FIG. 4. If the operational pattern setting flag 14a is not "1" (specifically, "0") (S11: No), the process can proceed to S24.

Furthermore, neither the operational pattern setting flag 14a nor the phone number list area 14b may be provided in the MFP 1. The status can be set to "busy" whenever communication with one of the external PCs 3 is started. Specifically, S11, S14, S15, and S24 can be omitted from FIG. 4 so that the Internet telephone communication process is started with S12.

In the embodiment, only three external PCs 3A to 3C are connected to the Internet network 200 for simplicity. However, any number of external PC, can be connected to the Internet network 200.

In the embodiment, the apology message area 12a stores the text data of the apology message. The CPU 11 reads the apology message from the apology message area 12a, and then instructs the Internet telephone program 34b to send the apology message to the call originating external PC. However, the apology message area 12a may not store the text data of the apology message. The CPU 11 may itself generate text data of the apology message and send the apology message to the call originating external PC.

What is claimed is:

1. A telephone device configured to communicate with a first external device, wherein:
   the telephone device is configured to receive, via a communication control device, a call from a second external device during a communication with the first external device,
   the communication control device is configured to be set to a first status that indicates that a call from the second external device is acceptable and a second status that indicates that a call from the second external device is unwanted,
   the communication control device comprises:
      a communication control unit configured to control the communication with the first external device;
      a call detection unit configured to detect a call from the second external device during the communication with the first external device; and
      a ring alert inhibiting unit configured to be actuated in the second status to inhibit issuance of a ring alert for informing reception of the call which is sent from the second external device and which is detected by the call detection unit, the telephone device comprises:
      a communication start instruction unit configured to instruct the communication control unit to start communication with the first external device; and
      a setting unit that is configured to instruct the communication control device to be set to the second status, when starting the communication with the first external device in accordance with the instruction by the communication start instruction unit, or while the communication control unit is executing communication with the first external device, and
   the communication control device further comprises a notification unit that is configured to notify the second external device that the communication control device is in the second status when the setting unit instructs the communication control device to be set to the second status, thereby enabling the second external device to determine that a call from the second external device is unwanted before that call is made to the telephone device.

2. The telephone device according to claim 1, further comprising:
   a display unit configured to display an indication that a call is received when the call is received from the second external device while the communication control device is in the second status.

3. The telephone device according to claim 1, further comprising a status indication storage unit configured to store data of a status indication indicating whether or not the communication control device is to be set to the second status, and
   wherein, when the communication with the first external device is started, the setting is configured to instruct the communication control device to be set to the second status if the status indication data stored in the status storage unit indicates that the communication control device is to be set to the second status.

4. The telephone device according to claim 1, further comprising:
   a counterpart-device basis status storage unit configured to store data of counterpart-device basis status indication indicating whether or not the communication control device is to be set to the second status in correspondence with each counterpart device to be communicated with;

an identification unit configured to identify which counterpart device the first external device is when communication is started with the first external device; and a status specifying unit configured to specify whether or not the communication control device should be set to the second status based on the identified counterpart-device, and by referring to the counterpart-device basis status storage unit, when the communication is started with the first external device, wherein, when the communication is started with the first external device, the setting is configured to instruct the communication control device to be set to the second status if the status specifying unit specifies that the communication control device should be set to the second status.

5. The telephone device according to claim 1, further comprising:

a change instruction accepting unit that is configured to accept an instruction to change the communication control device from the first status to the second status; and a change unit that is configured to instruct, during the communication with the first external device, the communication control device to be changed to the second status based on the instruction accepted by the change instruction accepting unit, if the communication control device is in the first status.

6. The telephone device according to claim 1, further comprising:

a communication disconnection detecting unit configured to detect a disconnection of the communication with the first external device; and another setting unit configured to instruct the communication control device to be set to the first status when the communication disconnection detecting unit detects the disconnection of the communication.

7. The telephone device according to claim 1, further comprising:

a message sending unit that is configured to instruct the communication control device to send a message to the second external device when a call is received from the second external device while the telephone device is performing communication with the first external device and the communication control device is in the second status, the message indicating that the telephone device is now performing communication and that the call from the second external device is unwanted.

8. The telephone device according to claim 7, wherein the message sending unit is configured to generate text data indicative of the message, and instruct the communication control device to send the text data to the second external device.

9. The telephone device according to claim 7, further comprising:

a storing unit configured to store text data indicative of the message before the sending unit instructs the communication control device to send the text data, wherein the message sending unit is configured to read the text data from the storing unit and instruct the communication control device to send the text data to the second external device.

10. A telephone device configured to receive, during communication with a first external device, a call from a second external device, the telephone device comprising:

a setting unit that is configured to set the telephone device to a first status that indicates that a call from the second external device is acceptable or a second status that indicates that a call from the second external device is unwanted, the setting unit being configured to set the telephone device to the second status, when communication is started with the first external device, or while the communication with the first external device is being executed;

a ring alert inhibiting unit configured to inhibit a sound of a ring alert for informing that a call has been received from the second external device when the telephone device is in the second status; and a notification unit that is configured to notify the second external device that the telephone device is in the second status when the setting unit sets the telephone device to the second status, thereby enabling the second external device to determine that a call from the second external device is unwanted before that call is made to the telephone device.

11. The telephone device according to claim 10, further comprising:

a display unit configured to display an indication that a call is received when the call is received from the second external device while the telephone device is in the second status.

12. The telephone device according to claim 10, further comprising a status indication storage unit configured to store data of a status indication indicating whether or not the telephone device is to be set to the second status, and wherein, when the communication with the first external device is started, the setting unit is configured to set the telephone device to the second status if the status indication data stored in the status storage unit indicates that the telephone device is to be set to the second status.

13. The telephone device according to claim 10, further comprising:

a counterpart-device basis status storage unit configured to store data of counterpart-device basis status indication indicating whether or not the telephone device is to be set to the second status in correspondence with each counterpart device to be communicated with;

an identification unit configured to identify which counterpart device the first external device is when communication is started with the first external device; and a status specifying unit configured to specify whether or not the telephone device should be set to the second status based on the identified counterpart-device and by referring to the counterpart-device basis status storage unit, when the communication is started with the first external device, wherein, when the communication is started with the first external device, the setting unit is configured to set the telephone device to the second status if the status specifying unit specifies that the telephone device should be set to the second status.

14. The telephone device according to claim 10, further comprising:

a change instruction accepting unit that is configured to accept an instruction to change the telephone device from the first status to the second status; and a change unit is configured to change, during the communication with the first external device, the telephone device to the second status based on the instruction accepted by the change instruction accepting unit, if the telephone device is in the first status.

15. The telephone device according to claim 10, further comprising:

a communication disconnection detecting unit configured to detect a disconnection of the communication with the first external device; and another setting unit configured to set the telephone device to the first status when the communication disconnection detecting unit detects the disconnection of the communication.

16. The telephone device according to claim 10, further comprising:
a message sending unit that is configured to send a message to the second external device when a call is received from the second external device while the telephone device is performing communication with the first external device and the telephone device is in the second status, the message indicating that the telephone device is now performing communication and that the call from the second external device is unwanted.

17. The telephone device according to claim 16,
wherein the message sending is configured to generate text data indicative of the message, and sends the text data to the second external device.

18. The telephone device according to claim 16, further comprising:
a storing unit configured to store text data indicative of the message before the sending unit sends the text data,
wherein the message sending is configured to read the text data from the storing unit and send the text data to the second external device.

* * * * *